March 17, 1953 S. R. GATES 2,631,761
FOLLOWER TYPE ICE-CREAM DISPENSING MACHINE
Filed July 11, 1950 3 Sheets-Sheet 1

INVENTOR.
Sam R. Gates
BY
Mason, Fenwick & Lawrence
ATTORNEYS

March 17, 1953 S. R. GATES 2,631,761
FOLLOWER TYPE ICE-CREAM DISPENSING MACHINE
Filed July 11, 1950 3 Sheets-Sheet 2
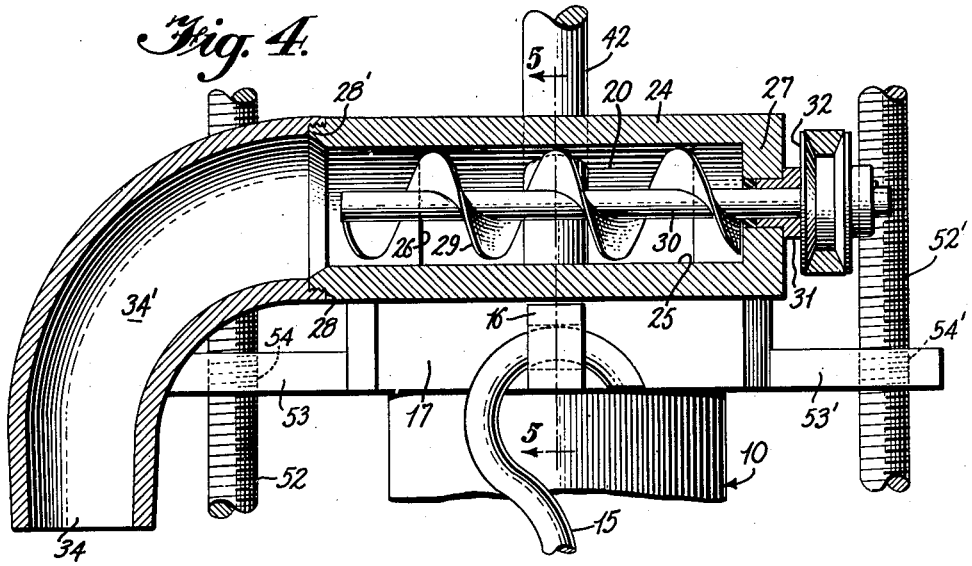
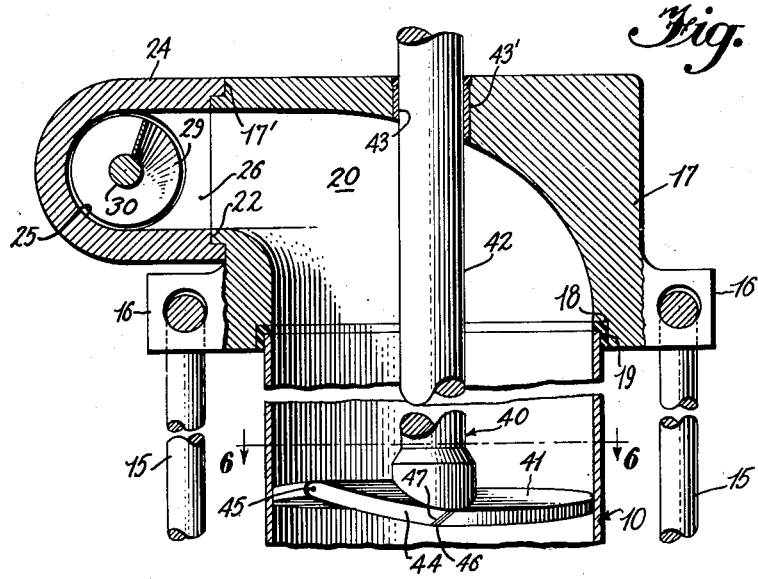
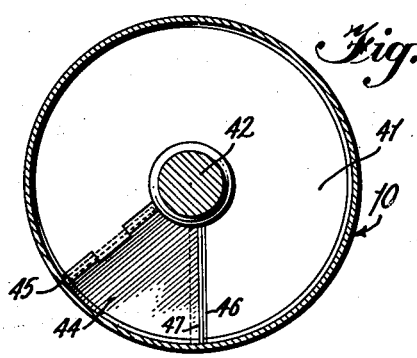
INVENTOR.
Sam R. Gates
BY
Mason, Fenwick & Lawrence
ATTORNEYS March 17, 1953 S. R. GATES 2,631,761
FOLLOWER TYPE ICE-CREAM DISPENSING MACHINE
Filed July 11, 1950 3 Sheets-Sheet 3
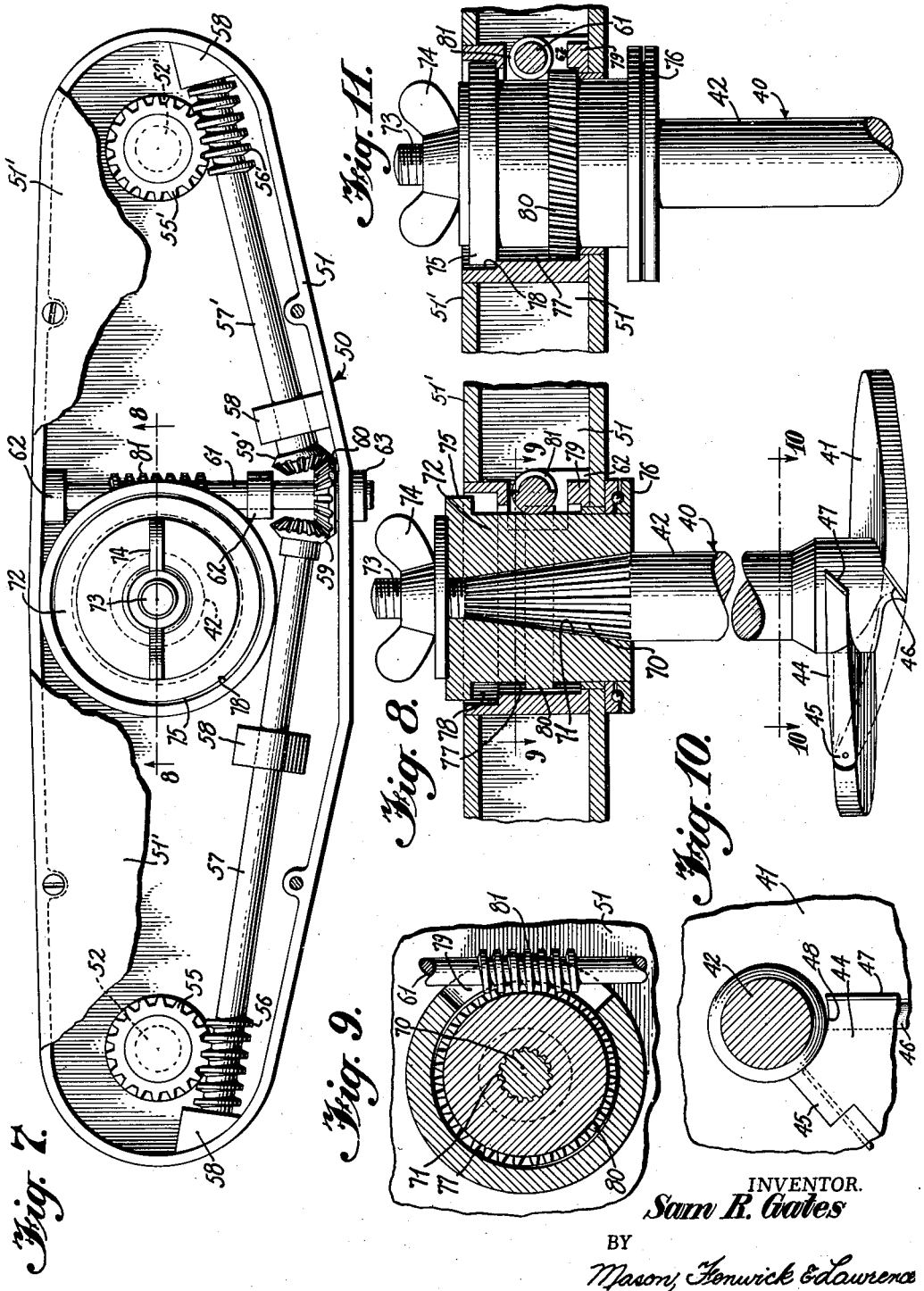
INVENTOR.
Sam R. Gates
BY
Mason, Fenwick & Lawrence
ATTORNEYS Patented Mar. 17, 1953

2,631,761

UNITED STATES PATENT OFFICE 2,631,761

FOLLOWER TYPE ICE-CREAM DISPENSING MACHINE

Sam R. Gates, Bristol, Tenn.

Application July 11, 1950, Serial No. 173,169

9 Claims. (Cl. 222—390)

The present invention relates in general to dispensing devices, and more particularly to devices for mechanically dispensing selected quantities of ice cream or like semi-solid substances from a bulk container.

An object of the present invention is the provision of a novel dispensing mechanism for plastic or semi-solid substances adapted to forcibly discharge the substance from a bulk container in suitable quantities.

Another object of the present invention is the provision of a novel dispensing mechanism for forcibly discharging selected quantities of semi-solid substances from a bulk container which is suitable for automatic or coin controlled operation.

Another object of the present invention is the provision of a novel dispensing apparatus for automatically or mechanically discharging ice cream or like plastic or semi-solid substances in predetermined bulk.

Another object of the present invention is the provision of a dispensing mechanism suitable for automatic or coin controlled operation, of comparatively simple, durable construction, efficient operation, and which can be manufactured and maintained at a relatively low cost.

Another object of the present invention is the provision of a novel device for dispensing ice cream from commercial ice cream bulk containers operative to forcibly withdraw the entire bulk of ice cream from the container and discharge the same through a suitable nozzle or spout in selected quantities.

Other objects, advantages and capabilities of the present invention will become apparent from the following detailed description, taken in conjunction with the accompanying drawings, wherein only a preferred embodiment is shown.

In the drawings:

Figure 4 is a vertical longitudinal section through the discharge nozzle and screw conveyor housing, taken along the lines 4—4 of Figure 3;

Figure 5 is a vertical transverse section through the container capping element and screw conveyor housing, illustrating a portion of the plunger mechanism, taken along the lines 5—5 of Figure 4;

Figure 6 is a horizontal section view of the bulk container and piston head of the plunger mechanism, taken along the lines 6—6 of Figure 5;

Figure 7 is a top plan view of the plunger driving mechanism housing, with portions of the housing removed to expose the internal drive mechanism;

Figure 8 is a vertical transverse section through the thrust collar forming the piston mounting, illustrating the piston and thrust collar in piston-head-inserting position, taken along the lines 8—8 of Figure 7;

Figure 9 is a horizontal section view taken through the piston thrust collar, and illustrating its intercoupling with the drive worm, taken along the lines 9—9 of Figure 8;

Figure 10 is a horizontal section through the piston rod of the plunger mechanism, illustrating the arrangement of the inner surface of the piston head hinged sector taken along the lines 10—10 of Figure 8; and Figure 11 is an elevational view of the thrust collar mounted in the drive mechanism housing, illustrated in piston-head-lifting position.

Figure 1:
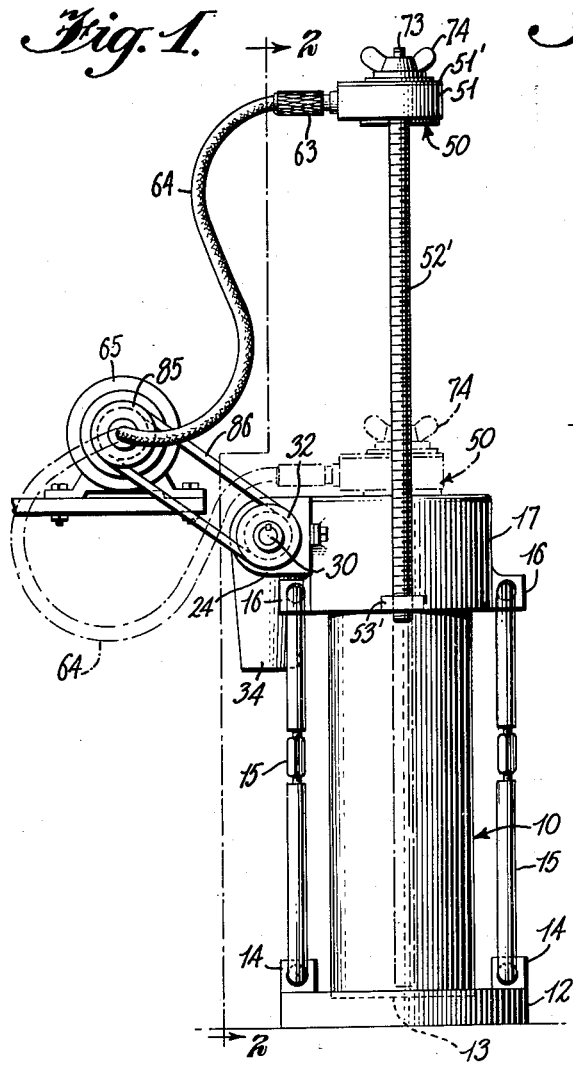
Figure 1 is an end elevation of an ice cream dispensing device embodying the present invention.
Figure 2:
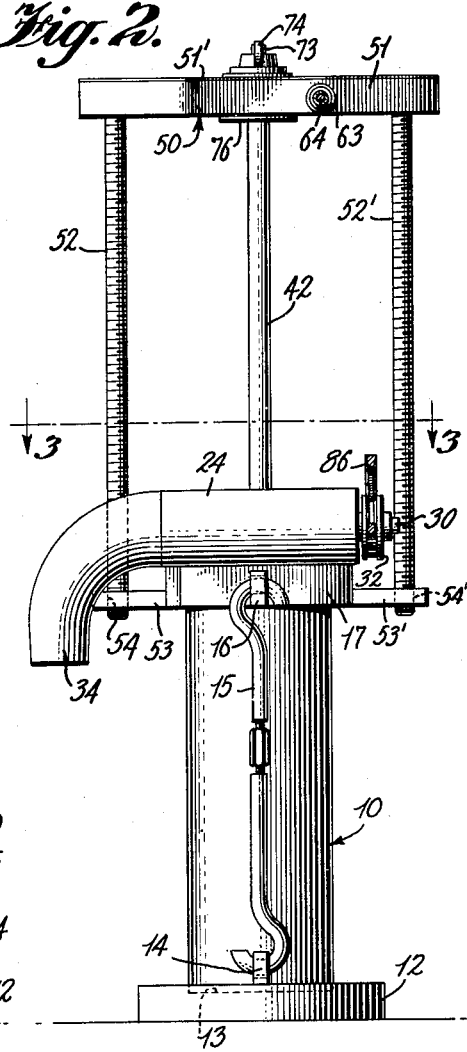
Figure 2 is a side elevation of the device illustrated in Figure 1.
Figure 3:
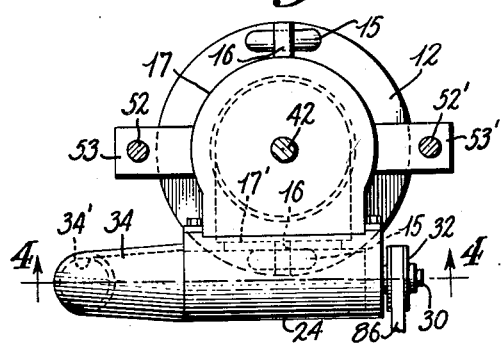
Figure 3 is a top plan view of the ice cream container mounting elements and discharge outlet, viewed from the position of line 3—3 of Figure 2.

The invention in general is directed to a dispensing device adapted to mechanically discharge selected quantities of ice cream from a bulk container, under either automatic or coin selector control, and to this end provides plunger means having an auger head adapted to be driven through the ice cream in a conventional bulk ice cream container to the bottom of the container and there to be deformed into a closed piston head to be withdrawn through the upper end of the container. Driving means are provided to rotate the plunger means about its shaft and force the plunger downwardly through the ice cream bulk and to withdraw the plunger without rotation for extracting ice cream from the container and discharging selected quantities of the ice cream through a convenient discharge nozzle.

The invention will be more clearly understood from the following detailed description, referring to the accompanying drawings, in which like reference characters refer to corresponding parts throughout the several figures.

The reference character 10 generally indicates a cylindrical bulk ice cream container of a conventional commercially available type, such as a conventional five-gallon ice cream container. The bulk ice cream container 10 is adapted to be encased at both ends to securely position the container relative to the work portions of the device. The lower closed end of the container is encased in a base member 12 by fitting the lower end of the container 10 into a suitable cylindrical recess 13 of the base member 12.

A pair of fastener lugs or bosses 14 are provided at diametrically opposed points adjacent the periphery of the base 12, adapted to be intercoupled through turnbuckles 15 with corresponding fastening lugs 16 on the capping element 17. The capping element 17 is adapted to be fitted over the upper open end of the cylindrical ice cream container 10, the capping element being provided with a cylindrical recess 18 of slightly greater diameter than that of the cylindrical container 10, lined with a resilient gasket element 19 adapted to tightly seal the edges of the recess 18 against leakage. The cylindrical capping element 17 is provided with an internal bore 20 coupled between the cylindrical recess 18 in the lower end of the capping element and a radial projection 17' on the side of the capping element, which bore is of reduced diameter toward the end opening through the projection 17'. A circular boss 22 is provided on the projection 17' surrounding the outlet opening of the bore 20 forming a raised lip adapted to snugly fit a corresponding cylindrical recess in a conduit member 24.

The conduit member 24 is provided with a cylindrical bore indicated at 25 having a branch bore 26 arranged at right angles thereto of a diameter corresponding to the outlet of the bore 20 in the capping element 17 and intercoupling the bore 20 to the cylindrical bore 25. The horizontal cylindrical bore 25 is closed at one end 27 of the conduit member 24 and opens through the opposite end 28. A threaded lip 28' is provided surrounding the open end of the bore 25.

Within the horizontal cylindrical bore 25 there is provided a continuous helical feed vane or screw conveyor 29 having a horizontal shaft 30 extending through and journaled in the closed end 27 of the member 24 by means of a journal 31. A suitable pulley 32 is keyed on the exposed end of the shaft 30 extending through the closed end 27.

To the threaded lip 28' surrounding the open end of the cylindrical bore 25 at the end 28 of the member 24 is threaded an elbow-shaped discharge nozzle or spout 34 by means of a threaded cylindrical recess in one end thereof. The discharge nozzle 34 is provided with a continuous bore 34' corresponding to or slightly greater than the diameter of the bore 25 and opening downwardly.

A continuous conduit channel is thereby formed from the upwardly opening end of the bulk container 10 to the discharge spout 34 through the bore 20 and the capping element 17, T-shaped bore 25 in the conduit member 24, and bore 34' in the elbow discharge spout 34.

A reciprocating plunger mechanism is provided to extract the ice cream from the container 10 by exerting an upward force on the entire bulk of the ice cream, urging the same into the bore 20 of the capping element 17 and thence into contact with the helical vane 29 in the conduit member 24. To achieve this arrangement, it is necessary to provide means whereby a force exerting portion of the plunger mechanism in contact with the ice cream bulk is operative to be driven downwardly through the entire bulk of the ice cream and disposed at the bottom of the container to extract the ice cream upwardly through the open end of the container 10. To this end, there is provided a piston assembly generally indicated at 40, comprising a disc-like piston head 41 rigidly coupled to an elongated piston shaft 42 extending upwardly through a suitable opening 43 in the top of the capping element 17 lined with resilient gasket element 43'.

The piston head 41, in order to be driven through the bulk of the ice cream to the bottom of the container 10, is shaped generally in the form of a single helical turn forming a disc corresponding to the inner diameter of the container 10. A sector 44 of the helical piston head 41 is formed separate from the remainder of the piston head 41 and hingedly coupled thereto along a radial axis by hinge means indicated at 45. The leading edge of the fixed portion of the piston head 41, indicated at 46, is provided with an inclined face to permit the head 41 to readily cut through the bulk of the ice cream in the container 10. The trailing edge 47 along the free side of the hinged piston head sector 44 is shaped to correspond to the inclined surface 46 at the leading edge of the head 41, to permit the piston head to be completely closed when the relative force from the weight of the ice cream bulk is directed downwardly against the upper face of the piston head 41. As shown in Figure 10, the inner surface 48 of the hinged sector 44 adjacent the piston rod 42 is shaped to form an elliptical surface, rather than an arcuate one following the curvature of the surface of the rod 42, to permit free angular movement of the sector 44 about the radial hinge 45. When the piston 40 is rotated in a clockwise direction, as viewed in Figures 5 and 8, it will be readily seen that the hinged piston head sector 44 will be disposed in alignment with the extension of the helix defined by the periphery of the fixed piston head 41, due to the resistance of the ice cream, thus in effect forming a screw auger head of the piston head 41 to permit the piston head to be readily driven to the bottom of the container 10.

Mechanical force must be applied both to rotate the piston rod 41 in a clockwise direction as well as to exert a downward force on the piston head. This is provided by a mechanism generally indicated at 50, and comprises a mechanism housing 51 having a removable cover plate 51' intercoupled by means of a pair of square threaded shafts 52, 52' to laterally extending diametrically opposed coupling lugs 53, 53' integrally coupled to the capping element 17. The square threaded shafts 52 are threaded into threaded apertures 54, 54' in the lugs 53, 53'. The upper end of the threaded shafts 52, 52' are suitably journaled in the housing 51 against movement in the direction of the longitudinal axis of the shafts 52, 52' and are provided with worm gears 55, 55' integrally coupled at the upper end to the shafts 52, 52'.

The shafts 52, 52' are adapted to be driven simultaneously in the same direction by means of worms 56, 56' intercoupled with the worm gears 55, 55', and formed on shafts 57, 57' journaled in bearings 58 and provided at their inner ends with bevel gears 59, 59'. The bevel gears 59, 59' are coupled to a single bevel drive gear 60 concentric with and fixed to a master shaft 61 journaled in bearings 62 and having an external coupling generally indicated at 63 extending outwardly from the housing 51 and adapted to be coupled to the suitable flexible drive shaft, as indicated at 64, connected to a shaft on an electric motor 65.

The piston rod 42 of the piston assembly 40 is provided with a tapered and splined upper end, as indicated at 70, adapted to be inserted through and intercoupled with a correspondingly tapered axial recess 71 in a cylindrical thrust collar 72 slidably journaled in the housing 51. To this end a threaded extension 73 is provided at the end of the tapered splined portion 71 extending beyond the outer end of the thrust collar 72 to permit the piston rod 42 to be coupled to the collar by means of suitable washer and wing nut indicated at 74.

The collar 72 is provided with a flanged upper end 75 and a thrust bearing on the lower end indicated at 76 adapted to retain the collar in the housing 51 and limit movement relative thereto. The collar 72 extends through a cylindrical recess 77 in the housing 51, having a recess of enlarged diameter 78 at the upper end thereof adapted to accommodate the flange 75 when the collar 72 is in relatively lowered position, and provided with a journal gasket 79 engaging the cylindrical body of the collar 72 to permit free rotary movement of the collar relative to the housing 51. A peripheral toothed ring forming a worm gear 80 is formed centrally along the body of the thrust collar 72, adapted to be selectively engaged by a worm 81 formed centrally of the master shaft 61 selectively intercoupled to the flexible drive shaft 64.

A pulley 85 is likewise provided on the drive shaft of the electric motor 65, intercoupled with the pulley 82 on the feed vane shaft 30 by means of a belt 86 to drive the helical feed vane 29.

Operation of the device to accomplish the functions enumerated is substantially as follows: The cylindrical bulk container 10 containing the ice cream or similar plastic substance to be dispensed is disposed with its end in the opposed recesses 13 and 18 of the base 12 and capping element 17, respectively. The turnbuckles or other suitable adjustable coupling means 15 are hooked into the opposed fastening lugs or bosses 14 and 16 on the base and capping element, respectively, and are adjusted to tightly clamp the respective elements against the sides of the container 10. The piston head 41 of the piston 40 forming the working piece of the plunger assembly, on attachment of the capping element 17 to the container, is disposed in withdrawn position within the central bore 20 of the capping element 17, with the lower face of the piston head 41 resting on the upper surface of the ice cream in the bulk container.

The plunger operating mechanism, generally indicated at 50, is then attached to the assembly by first fitting the thrust collar 72 in the housing 51 on to the upper exposed end 70 of the piston rod 42. The splined and tapered recess 71 securely interfits the correspondingly tapered and splined upper end 70 of the rod 42 to prevent relative movement between the two. The washer and wing nut assembly 74 is then threaded onto the exposed end 73 of the piston rod 42 to secure the collar to the piston rod. The lower ends of the square threaded coupling shafts 52, 52' are threaded into their respective complementary threaded apertures 54, 54' on the lugs or bosses 53, 53' of the capping element 17, and the externally exposed coupling 63 is intercoupled with the coupling member on the end of the flexible shaft 74.

Application of torque from the electric motor 65 to the shaft 61 connected to the exposed coupling 63 drives the shafts 57, 57' intercoupled through bevel gears 59, 59' and bevel gears 60 on shaft 61. The shafts 57, 57' carry worms 56, 56' coupled with spur gears 55, 55' on the square threaded shafts 52, 52'. These, when the mechanism housing 51 is in elevated position, are driven in a direction to draw the mechanism housing 51 downwardly toward the capping element 17 by interaction of the square threads on the shafts 52, 52' with the corresponding threaded apertures 54, 54' in the lugs 53, 53'.

Simultaneously with rotation of the square threaded rods 52, 52' to draw the housing 51 downwardly toward the capping element 17, the worm 81 on the master driven shaft 61 is intercoupled with the peripheral gear formed by the teeth 80 on the body of the thrust collar 72. This occurs because, when the mechanism housing 51 and the piston 40 are drawn downwardly by rotation of the threaded shafts 52, 52', an upwardly directed resisting force is exerted upon the lower surface of the piston head 41, urging the thrust collar into uppermost position within the aperture 77 with the thrust bearing 76 disposed against the lower face of the housing 51. In this elevated position of the thrust collar 72, the peripheral gear ring 80 is positioned immediately adjacent the worm 81 on the shaft 61 to effect clockwise rotation of the piston rod 42 and the piston head 41. The leading edge 46 of the piston head 41 is thus driven into the bulk of ice cream or like material in the container 10 and cams itself downwardly toward the bottom of the container in screw auger fashion, the trailing portion of the hinged segment 44 being urged into helical alignment with the remaining portion of the piston head 41 by the resistance exerted on the faces thereof from the ice cream.

When the piston head 41 of the piston 40 has thus been driven to the bottom of the container 10, a reverse torque is then applied to the master shaft 61 to effect discharge of selected quantities of ice cream from the nozzle 34. This may be accomplished by electric control of the motor 65 from a remote pushbutton or by other conventional electrical energizing control devices. Counter rotation of the master drive shaft 61, relative to the previously described rotary movement, effects corresponding counter rotation of the square threaded shafts 52, 52' tending to cam the mechanism housing 51 into a relatively elevated position. The weight of the ice cream in the container 10 bearing on the upper surface of the piston head 41 then urges the thrust collar 72 into downwardmost position within the recess 77 with its peripheral upper flange 75 nested in the corresponding recess 78 of the housing 51. In this lowermost position of the thrust collar 72, the fixed peripheral gear ring 80 is disposed relatively beneath the worm 81 on the master drive shaft 61 decoupled therefrom so that no counterclockwise rotation is imparted to the piston head 41 as the piston is withdrawn upwardly from the container.

This withdrawal movement of the piston 40 and piston head 41 upwardly out of the container closes the hinged piston head sector 44 under weight of the ice cream so that the trailing edge 47 thereof bears against the leading edge 46 of the plunger head 41, and withdraws the entire bulk of the ice cream upwardly through the upward open end of the container 10 and into recess 20.

The recess 20 being of reduced diameter toward its outer end coupled to the branch channel 26 in the conduit member 24, couples the ice cream urged upwardly through the bore 20 into contact with the rotating helical vane 29 in the horizontal bore 25 of the conduit member 24. The helical vane 29, driven continuously by the intercoupling of its pulley 32 with a drive pulley 85 on the electric motor 65 through belt 86 urges the ice cream through the open end of the cylindrical bore 25 and the elbow shaped discharge nozzle 34 into any suitable container, cone, or the like. The quantity of ice cream discharged through the nozzle 34 is thus controlled by regulating the upward movement of the housing 51 on rotation of the square threaded shafts 52, 52'. This, of course, can be conveniently controlled by selectively energizing the electric motor 65 for a given period of time, or by other convenient manually or coin controlled devices regulating the energization of the electric motor 65.

The present device may be conveniently employed, in the form described, in restaurants, drugstores and the like, to provide for ready discharge of selected quantities of ice cream directly from a bulk ice cream container into cups, cones and the like. When employed in this manner, the time and labor consuming operations of manually digging desired quantities of ice cream from the bulk of ice cream in the container are eliminated. The device is also well adapted for use in ice cream packing operations, to rapidly and efficiently fill half pint, pint and quart packages from the bulk ice cream in the container.

The instant device is particularly adapted for use in connection with coin controlled automatic ice cream dispensers, the device being mounted in a suitable cabinet or the like providing access only to the discharge nozzle 34. Any conventional coin selector means may be coupled with the electric motor 65 to determine the period of energization of the motor. This would be adjusted in a known manner to proportion the distance of travel of the piston 40 upward through the container 10 to regulate the quantity of ice cream dispensed through the nozzle 34.

While but one particular embodiment of the invention has been shown and described, it is distinctly understood that the invention is not limited thereto but that various modifications may be made in the invention without departing from the spirit and scope thereof, and it is desired that only such limitations shall be placed thereon as are imposed by the prior art and are set forth in the appended claims.

What is claimed is:

1. A dispensing apparatus for extracting a plastic or semi-solid substance from a bulk container comprising, plunger means disposed for reciprocal movement through the container having a plunger head adapted to be inserted in an open end of said container, movable means provided with said plunger head forming said plunger head into a screw auger disc on entrant movement of the plunger head into said container and movable to form a closed piston head on exit movement of the plunger head, and drive means coupled to said plunger means for imparting entrant and exit movement to said plunger means for forcing said plunger head through the substance in said container to the end thereof remote from said open end and for extracting the entire body of the substance from said container on exit movement of said plunger head.

2. A dispensing apparatus for extracting a plastic or semi-solid substance from a bulk container comprising, a plunger assembly having a plunger head disposed for insertion in an open end of said container and for reciprocal movement through the container, movable means provided with said plunger head forming said plunger head into a screw auger disc on entrant movement of the plunger head into said container and movable to form a closed piston head on exit movement of the plunger head, and drive means coupled to said plunger assembly for imparting reciprocal entrant and exit movement to said plunger head and for imparting rotary motion to said plunger head on the entrant stroke only.

3. A dispensing apparatus for extracting a plastic or semi-solid substance from a bulk container comprising closure means for capping an open end of the bulk container, a discharge nozzle coupled with said closure means and conduit means formed in said closure means intercoupling the open end of said container and said nozzle, plunger means extending into the bore in said closure means and having a plunger head disposed for reciprocal movement through the container, movable means formed on said plunger head for forming said plunger head into a screw auger disc on entrant movement of the plunger head into said container and movable under the weight of material in said container bearing thereon on entrant movement of the plunger head to define a closed piston head, and drive means coupled to said plunger means for imparting reciprocal entrant and exit movement to said plunger head and for imparting rotary movement to said plunger head on the entrant stroke only.

4. A dispensing apparatus for extracting a plastic or semi-solid substance from a bulk container comprising, plunger means having a plunger head extending into an open end of said container and mounted for reciprocal movement through the container, said plunger head being in helical disc form defining a screw auger disc on entrant movement of the plunger head into said container and having a sector thereof mounted for pivotal movement on a radial axis to be pivoted out of its normal helical path under the weight of said substance and form said plunger head into a closed piston head on exit movement thereof, and reciprocal drive means coupled to said plunger means for imparting entrant and exit movement thereto.

5. A dispensing apparatus for extracting a plastic or semi-solid substance from a bulk container comprising, plunger means having a plunger head extending into an open end of said container and mounted for reciprocal movement through the container, said plunger head being in helical disc form defining a screw auger disc on entrant movement of the plunger head into said container and having a sector thereof mounted for pivotal movement on a radial axis to be pivoted out of its normal helical path under the weight of said substance and form said plunger head into a closed piston head on exit movement thereof, drive means coupled to said plunger head for imparting reciprocal entrant and exit movement to said plunger head and for imparting rotary motion to said plunger head on the entrant stroke only.

6. A dispensing apparatus for extracting a plastic or semi-solid substance from a bulk container comprising, closure means for capping an open end of said bulk container, a discharge nozzle coupled with said closure means and a bore formed in said closure means intercoupling the open end of said container and said nozzle, plunger means mounted in said closure means and having a plunger head extending into said bore disposed for reciprocal movement through said container, said plunger head being in helical disc form defining a screw auger disc on entrant movement of the plunger head into said container and having a sector thereof mounted for pivotal movement on a radial axis to be pivoted out of its normal helical path under the weight of said substance and form said plunger head into a closed piston head on exit movement thereof, and reciprocal drive means coupled to said plunger means for imparting entrant and exit movement thereto including a slidably mounted thrust collar normally coupled with a second drive means on entrant movement of said plunger head to rotate said plunger means and decoupled from said second drive means by movement of said collar under the weight of said substance on exit movement of the plunger head.

7. A dispensing apparatus for extracting a plastic or semi-solid substance from a bulk container comprising, closure means for capping an open end of said bulk container, a discharge nozzle coupled with said closure means and a bore formed in said closure means intercoupling the open end of said container and said nozzle, plunger means mounted in said closure means and having a plunger head extending into said bore disposed for reciprocal movement through said container, said plunger head being in helical disc form defining a screw auger disc on entrant movement of the plunger head into said container and having a sector thereof mounted for pivotal movement on a radial axis to be pivoted out of its normal helical path under the weight of said substance and form said plunger head into a closed piston head on exit movement thereof, and drive means coupled to said plunger head for imparting a reciprocal entrant and exit movement to said plunger head and for imparting rotary motion to said plunger head on the entrant stroke only.

8. In a dispensing apparatus for extracting a plastic or semi-solid substance from a bulk container, the combination recited in claim 5, wherein a shaft is coupled to said plunger head and said drive means includes a thrust collar mounted on said shaft, said collar being journaled for rotation in a journal housing and movable axially relative thereto, worm gear means mounted on the periphery of said thrust collar disposed on entrant movement of said plunger means to be engaged with a drive worm journaled in said bearing housing and movable out of engagement with said worm on exit movement of said plunger means, whereby rotary motion is imparted to said thrust collar on entrant movement of said plunger means only.

9. In a dispensing apparatus for extracting a plastic or semi-solid substance from a bulk container, the combination recited in claim 7, wherein a shaft is coupled to said plunger head and said drive means includes a thrust collar mounted on said shaft, said collar being journaled for rotation in a journal housing and movable axially relative thereto, worm gear means mounted on the periphery of said thrust collar disposed on entrant movement of said plunger means to be engaged with a drive worm journaled in said bearing housing and movable out of engagement with said worm on exit movement of said plunger means, whereby rotary motion is imparted to said thrust collar on entrant movement of said plunger means only, and rotary means interconnecting said journal housing and said closure means in screw thread engagement with said closure means for reciprocally moving said bearing housing toward and away from said closure means.

SAM R. GATES.

REFERENCES CITED

The following references are of record in the file of this patent:

UNITED STATES PATENTS

| Number | Name | Date |
| --- | --- | --- |
| 1,068,153 | Mittendorf | July 22, 1913 |